United States Patent
Momiuchi et al.

(10) Patent No.: US 7,203,218 B2
(45) Date of Patent: Apr. 10, 2007

(54) SOLID-STATE LASER DEVICE

(75) Inventors: Masayuki Momiuchi, Tokyo-to (JP);
Taizo Eno, Tokyo-to (JP); Yoshiaki Goto, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 220 days.

(21) Appl. No.: 10/771,940

(22) Filed: Feb. 4, 2004

(65) Prior Publication Data

US 2004/0165630 A1 Aug. 26, 2004

(30) Foreign Application Priority Data

Feb. 21, 2003 (JP) ............................. 2003-044933

(51) Int. Cl.
*H01S 3/13* (2006.01)
*H01S 3/00* (2006.01)
*H01S 3/082* (2006.01)

(52) U.S. Cl. ................. 372/97; 372/29.015; 372/38.07
(58) Field of Classification Search .................... 372/97
See application file for complete search history.

(56) References Cited

U.S. PATENT DOCUMENTS 5,077,750 A * 12/1991 Pocholle et al. ............... 372/68
5,418,810 A *  5/1995 Eguchi et al. ................ 372/98

OTHER PUBLICATIONS

Schnitzler et al. ("All-solid-state tunable continuous-wave ultraviolet source with high spectral purity and frequency stability" Applied Optics, vol. 41 No. 33 pp. 7000-7005. 2002).*

* cited by examiner

*Primary Examiner*—Armando Rodriguez
(74) *Attorney, Agent, or Firm*—Nields & Lemack

(57) ABSTRACT

A solid-state laser device, comprising two or more resonators for outputting laser beams on a same axis, a first light emitter and a second light emitter for entering excitation light to each of the resonators, a photodetector for monitoring which monitors the outputted laser beams, and a control unit for performing constant output control of at least one of the first light emitter and the second light emitter based on a signal from the photodetector for monitoring.

5 Claims, 4 Drawing Sheets

CONTROL SIGNAL

APC

LD CURRENT

OUTPUT

SOLID-STATE LASER DEVICE

BACKGROUND OF THE INVENTION

The present invention relates to a solid-state laser device, and in particular, to a solid-state laser device, in which an output of a semiconductor-pumped solid-state laser device is controlled.

Referring to FIG. 5, description will be given below on general features of a semiconductor-pumped solid laser device.

In FIG. 5, reference numeral 1 denotes a light emitter which has a single diode or a plurality of laser diodes for emitting a laser beam with a wavelength λ as an excitation light. Reference numeral 2 represents a resonator for outputting a laser beam with a wavelength λ1.

The resonator 2 primarily comprises a reflection mirror 3, an output mirror 4 arranged at a position opposite to the reflection mirror 3, and a laser crystal 5 disposed on an optical axis of the output mirror 4 and the reflection mirror 3. On the reflection mirror 3 and the output mirror 4, a dielectric reflection films 6 and 7 are formed respectively.

On an optical axis on an output side of the resonator 2, a partial mirror 8 is disposed, and the partial mirror 8 splits the laser beam outputted from the resonator 2 and projects a part of the laser beam toward a photodetector 9 for monitoring. A photodetection signal from the photodetector 9 for monitoring is inputted to a control unit 11, and the control unit 11 controls the light emitter 1 so that the intensity of an output light from the resonator 2 is maintained at a constant level.

As the laser crystal 5, YAG (yttrium aluminum garnet) or $YVO_4$ doped with $Nd^{3+}$ ions is used, for instance.

In the semiconductor-pumped solid-state laser device as described above, when the light emitter 1 is driven, an excitation light is emitted to the resonator 2 through the reflection mirror 3. The excitation light passes through the laser crystal 5 and is pumped between the dielectric reflection films 6 and 7 and is amplified. Then, a laser beam 12 with a wavelength λ1 is outputted through the output mirror 4.

The laser beam 12 is projected through the partial mirror 8 and is split by the partial mirror 8 and enters the photodetector 9 for monitoring. The photodetection signal from the photodetector 9 for monitoring is inputted to the control unit 11. Based on the photodetection signal, the control unit 11 controls the driving of the light emitter 1 so that the intensity of the laser beam 12 is maintained at a constant level.

When a control signal for setting the intensity of the laser beam 12 from the resonator 2 is inputted to the control unit 11 (see FIG. 6(A)), a driving current to be supplied to the light emitter 1 is controlled so that the intensity of the laser beam 12 is maintained at a constant level (see FIG. 6(C)). Because the driving current must respond to fluctuation of values such as a temperature of the laser crystal 5, the driving current is not at constant level (see FIG. 6(B)).

In a prior application (Japanese Patent Application 2002-335683), the present applicants have proposed a solid-state laser device which comprises a plurality of resonators sharing an optical axis.

The solid-state laser device as proposed above is advantageous in that the output of the laser beam is increased, and a plurality of laser beams with different wavelengths can be outputted, and the structure of the device can be formed in simple design.

SUMMARY OF THE INVENTION

It is an object of the present invention to provide a solid-state laser device which comprises a plurality of resonators, by which it is possible to improve output control of an laser beam.

To attain the above object, the solid-state laser device according to the present invention comprises two or more resonators for outputting laser beams on a same axis, a first light emitter and a second light emitter for entering excitation light to each of the resonators, a photodetector for monitoring which monitors the outputted laser beams, and a control unit for performing constant output control of at least one of the first light emitter and the second light emitter based on a signal from the photodetector for monitoring. Also, the present invention provides the solid-state laser device as described above, wherein at least one of the first light emitter and the second light emitter is placed under constant output control, and the other of the first light emitter and the second light emitter is driven with a constant current. Further, the present invention provides the solid-state laser device as described above, wherein the device is designed in such manner that an output change rate to an electric current to drive the first light emitter is made different from an output change rate to an electric current to drive the second light emitter. Also, the present invention provides the solid-state laser device as described above, wherein the control unit selectively controls the first light emitter and the second light emitter under constant output control. Further, the present invention provides the solid-state laser device as described above, wherein the two or more resonators each have beam waists, and positions of the beam waists are approximately equal to each other.

DETAILED DESCRIPTION OF THE PREFERRED EMBODIMENTS

Description will be given below on embodiments of the present invention.

Figure 1:
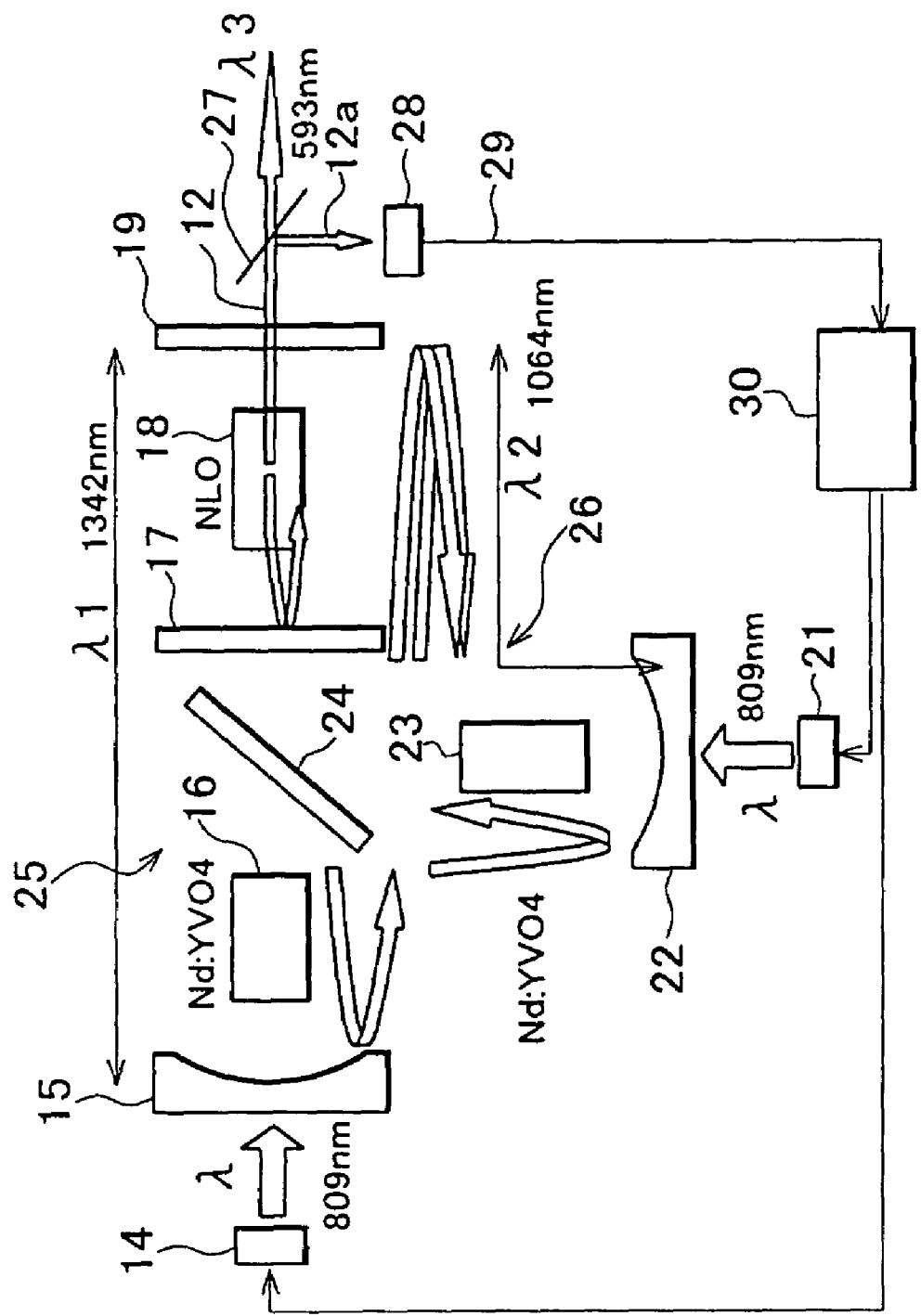
FIG. 1 is a schematical block diagram of an embodiment of the present invention.

FIG. 1 shows a solid-state laser device which comprises two resonators. The two resonators commonly share a part of an optical axis, and the resonators are constructed so as to project a laser beam along the same axis.

On a first optical axis, there are arranged a first light emitter 14, a first concave mirror 15, a first solid-state laser medium (a first laser crystal) 16, an intermediate mirror 17, a non-linear optical medium (optical crystal for wavelength conversion) 18, and an output mirror 19.

Between the first laser crystal 16 and the intermediate mirror 17, along a second optical axis crossing the first optical axis, for instance, at an angle of 90°, there are provided a second light emitter 21, a second concave mirror 22, and a second solid-state laser medium (a second laser crystal) 23. A wavelength splitting plate 24 is arranged at a position where the first optical axis crosses the second optical axis. The second optical axis is deflected by the wavelength splitting plate 24, and a part of the optical axis between the wavelength splitting plate 24 and the output mirror 19 is commonly shared by the first optical axis and the second optical axis. The optical crystal 18 for wavelength conversion is disposed on the commonly shared portion of the first optical axis and the second optical axis.

The first concave mirror 15 is highly transmissive to an excitation light with a wavelength $\lambda$, and it is highly reflective to a first fundamental wave with a wavelength $\lambda 1$. The intermediate mirror 17 is highly transmissive to the wavelength $\lambda 1$ and a second fundamental wave with a wavelength $\lambda 2$, and it is highly reflective to a wavelength conversion light with a wavelength $\lambda 3$ [SHG1 ($\lambda 1/2$) and SHG2 ($\lambda 2/2$), sum frequency (SFM: $1/\lambda 3=1/\lambda 1+1/\lambda 2$) or difference frequency (DFM: $1/\lambda 3=1/\lambda 1-1/\lambda 2$); Hereinafter, description will be given on sum frequency (SFM)]. Further, the output mirror 19 is highly reflective to the wavelengths $\lambda 1$ and $\lambda 2$, and it is highly transmissive to the wavelength conversion light with the wavelength $\lambda 3$.

The second concave mirror 22 is highly transmissive to the excitation light $\lambda$, and it is highly reflective to the second fundamental wave $\lambda 2$. The wavelength splitting plate 24 is highly transmissive to the first fundamental wave $\lambda 1$, and it is highly reflective to the second fundamental wave $\lambda 2$. A first resonator 25 for the first fundamental wave is made up by components from the first concave mirror 15 to the output mirror 19, and a second resonator 26 for the second fundamental wave is made up by components from the second concave mirror 22 to the output mirror 19.

On the optical axis on an output side of the output mirror 19, a luminous flux splitting member 27 such as a partial mirror for splitting luminous flux is arranged. The luminous flux splitting member 27 splits a part of the laser beam 12 projected from the output mirror 19, and the part of luminous flux 12a thus split is directed toward a photodetector 28 for monitoring. The photodetector 28 for monitoring monitors the laser beam projected from the solid-state laser device by receiving the luminous flux 12a. A photodetection signal 29 from the photodetector 28 for monitoring is sent to a control unit 30, and the control unit 30 controls light emitting conditions of the first light emitter 14 and the second light emitter 21 based on the photodetection signal 29.

In the arrangement as described above, the first light emitter 14 and the second light emitter 21 respectively emit a light with a wavelength $\lambda=809$ nm as an excication light. Nd:YVO$_4$ with oscillation lines of 1342 nm and 1064 nm is used as the first laser crystal 16 and the second laser crystal 23. In this case, KTP (KTiOPO$_4$; potassium titanyl phosphate) is used as the optical crystal 18 for wavelength conversion. A distance L1 between a reflection surface of the first concave mirror 15 and a reflection surface of the output mirror 19 and a distance L2 between a reflection surface of the second concave mirror 22 and the reflection surface of the output mirror 19 are set in such manner that a beam waist $\omega 1$ of the first resonator 25 is approximately equal to a beam waist $\omega 2$ of the second resonator 26. Each of beam wast $\omega 1$ and beam wast $\omega 2$ is located inside the optical crystal 18 for wavelength conversion or nearby the optical crystal 18 for wavelength converstion.

A laser beam emitted from the first light emitter 14 passes through the first concave mirror 15 and is reflected by the first concave mirror 15 in the first resonator 25, and the laser beam is converged to the first laser crystal 16. A laser beam of the first fundamental wave with the wavelength $\lambda 1=1342$ nm is oscillated between the first concave mirror 15 and the output mirror 19.

A laser beam emitted from the second light emitter 21 passes through the second concave mirror 22 and is reflected by the output mirror 19 and the second concave mirror 22 in the second resonator 26. Then, the laser beam is converged to the second laser crystal 23. Thus, a laser beam of the second fundamental wave with the wavelength $\lambda 2=1064$ nm is oscillated between the second concave mirror 22 and the output mirror 19.

Further, when the laser beams of the first fundamental wave $\lambda 1$ and the second fundamental wave $\lambda 2$ pass through the optical crystal 18 for wavelength conversion, a sum frequency wave of 593 nm is generated. A laser beam with wavelength 593 nm directed toward the intermediate mirror 17 is reflected by the intermediate mirror 17, and it is projected from the output mirror 19 as a laser beam with wavelength of 593 nm.

In the solid-state laser device as described above, the first resonator 25 and the second resonator 26 are designed in such manner that all components except the intermediate mirror 17, the optical crystal 18 for wavelength conversion, and the output mirror 19 are arranged at separated positions. Thus, the laser beam entering from the first light emitter 14 to the first resonator 25 form a light converging point between the first concave mirror 15 and the wavelength splitting plate 24, and the converging point is positioned within or near the first laser crystal 16. Similarly, the laser beam entering from the second light emitter 21 into the second resonator 26 form a light converging point between the second concave mirror 22 and the wavelength splitting plate 24, and the converging point is positioned within or near the second laser crystal 23.

Excitation efficiency of the first laser crystal 16 and the second laser crystal 23 is influenced by energy density of the laser beam or by a direction of polarization. Because the positions of the first laser crystal 16 and the second laser crystal 23 can be adjusted separately, the first laser crystal 16 and the second laser crystal 23 these can be set at optimal positions. Also, the adjustment of the direction of polarization can be performed in easy manner because adjustment can be made separately for the first light emitter 14 and the second light emitter 21. Further, the adjustment of positions of the optical members, e.g. alignment of optical axes of the first concave mirror 15 and the second concave mirror 22, can be carried out in easy manner because the adjustment of one member does not exert influence on the adjustment of the other, and the other member can be adjusted after the adjustment of one member has been completed. In addition, the polarizing lights of two excitation lights can be made parallel to each other or to cross each other. Thus, there is no special limitation to the optical crystal 18 for wavelength conversion, and any type of optical crystal for wavelength conversion can be used.

The commonly used portion of the first optical axis and the second optical axis can be made consistent with each other. By making the commonly used portion perfectly consistent with each other, conversion efficiency of the optical crystal 18 for wavelength conversion can be improved.

It may be designed in such manner that the first resonator 25 and the second resonator 26 oscillate with the same wavelength ($\lambda 1=\lambda 2$). In this case, a polarization separating plate (P/S) is used as the wavelength splitting plate 24. Oscillation wavelength is, for example, 1064 nm (green at 532 nm) in case of Nd:YAG.

When two or more optical crystals for wavelength conversion 18 are prepared and angle adjustment is made for DFM, SHG1 (λ1/2), and SHG2 (λ2/2) respectively, and when these are separately placed in the commonly used portion of the first optical axis and the second optical axis, the wavelength will be 5136 nm as DFM, 671 nm as SHG1 (λ1/2), and 532 nm as SHG2 (λ2/2).

Specifically, when the optical crystal 18 for wavelength conversion for DFM is inserted under the condition that the laser beams are projected from the first light emitter 14 and the second light emitter 21, a laser beam of difference frequency is outputted. When the optical crystal 18 for wavelength conversion for 1342 nm is inserted under the condition that the laser beam is projected only from the first light emitter 14, a laser beam with wavelength of 671 nm is outputted. Also, when the optical crystal 18 for wavelength conversion for 1064 nm is inserted under the condition that the laser beam is projected only from the second light emitter 21, a laser beam with wavelength 532 nm is outputted.

In the arrangement as described above, the laser beam from the first light emitter 14 is projected alone to the first laser crystal 16, and the laser beam from the second light emitter 21 is projected alone to the second laser crystal 23. Thus, the load applied on the first laser crystal 16 and the second laser crystal 23 is reduced. A wavelength conversion light can be obtained by the laser beams from the first light emitter 14 and the second light emitter 21, and the light with high output can be achieved.

As the optical crystal 18 for wavelength conversion, BBO (β-BaB$_2$O$_4$; β-Barium borate), LBO (LiB$_3$O$_5$; lithium triborate), KNbO$_3$ (potassium niobate), etc. may be used in addition to KTP.

Now, description will be given on output control in the solid-state laser device with the above arrangement.

When the laser beams with two wavelengths are superimposed on each other, an output P3 (λ3) of the laser beam 12 outputted after wavelength conversion is expressed by the expression (1) as given below if it is assumed that an output of the fundamental wave of the first resonator 25 is P1 (λ1) and an output of the fundamental wave of the second resonator 26 is P2 (λ2):

$$P3\ (\lambda 3) \propto P1\ (\lambda 1) \cdot P2\ (\lambda 2) \qquad (1)$$

Therefore, when one of the fundamental waves λ1 and λ2, e.g. λ1 of the first resonator 25, is oscillated at a predetermined constant level and an LD current to be supplied to the second light emitter 21 is controlled with respect to λ2 oscillated by the second resonator 26, it is possible to control the output of the laser beam 12 (λ3).

When the influences exerted on the optical output λ3 (λ3) are different in the fundamental waves P1 (λ1) and P2 (λ2) respectively, output control can be carried out by giving full consideration on the property of the optical output.

In FIG. 1, a constant LD current is supplied to the first light emitter 14 (ACC: Auto Current Control). For an LD current supplied to the second light emitter 21, constant output control (APC: Auto Power Control) is performed based on the photodetection signal 29 from the photodetector 28 for monitoring.

Figure 2A:
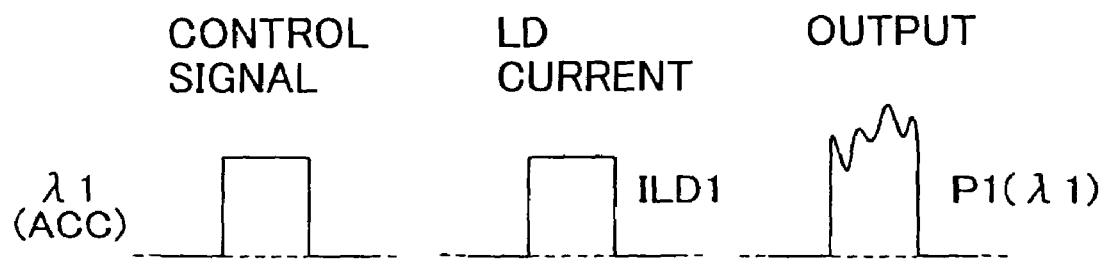
FIG. 2 represents drawings to explain control conditions of the embodiment.

FIG. 2(A) shows a case where constant current control of the LD current is performed with respect to the first light emitter 14. When constant current control is performed, conversion efficiency is fluctuated, etc. to match the change such as temperature change of the first laser crystal 16, and the output is varied.

Figure 2B:
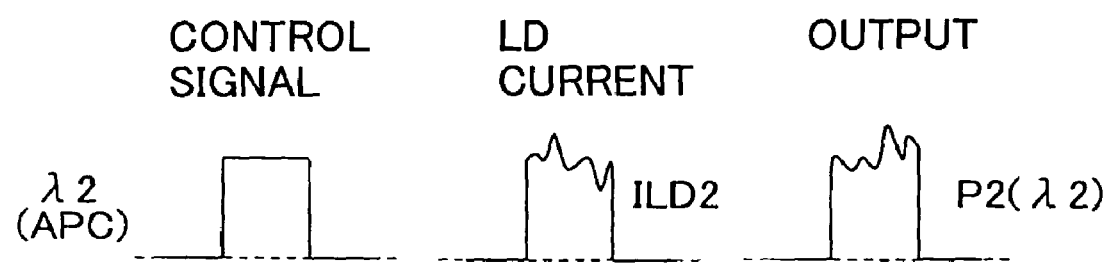
Figure 2C:

FIG. 2(B) shows constant output control with respect to the second light emitter 21. As shown in FIG. 2(C), the LD current to the second light emitter 21 is controlled in such manner that the value of the output P3 (laser beam 12) is at a constant level. Thus, the LD current is fluctuated, and the output P2 from the second resonator 26 is also fluctuated.

It may be designed in such manner that constant current control is performed to the second light emitter 21, and constant output control is carried out to the first light emitter 14.

As the first light emitter 14 and the second light emitter 21, the light emitters of the same specification may be used. Also, as the first resonator 25 and the second resonator 26, the resonators for outputting laser beams of the same wavelength may be used.

As the first light emitter 14, the second light emitter 21 and driving units for these light emitters, those with different output change ratio (sensitivity) with respect to the change of the LD current may be used.

Figure 3A:
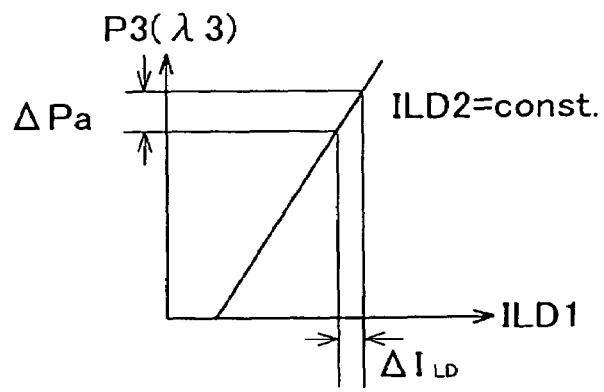
FIG. 3 represents diagrams to explain control characteristics of the embodiment.
Figure 3B:
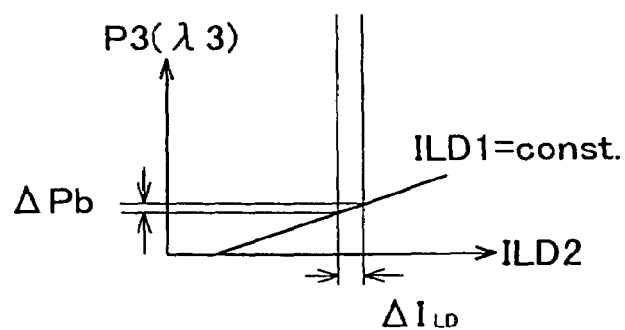

For instance, FIG. 3(A) represents a case where the output of the fundamental wave P1 (λ1) of the first resonator 25 is sensitive to the change of the LD current. Also, FIG. 3(B) shows a case where the output of the fundamental wave P2 (λ2) of the second resonator 26 is insensitive to the change of the LD current. That is, in FIG. 3(A), there is a change of ΔPa to a change ΔI LD of the LD current, while, in FIG. 3(B), there is a change of ΔPb (ΔPa>ΔPb) to a change ΔI LD of the LD current.

Therefore, when constant current control is performed on the second light emitter 21 and constant output control is performed on the first light emitter 14, output control with good response and high sensitivity suitable for optical modulation, etc. can be carried out. Also, when constant current control is performed on the first light emitter 14 and constant output control is performed on the second light emitter 21 with respect to the value of output P3 (laser beam 12), it is possible to carry out output control with low sensitivity and low responsiveness. By suppressing the responsiveness, the response to intrusion of disturbance, etc. or noise caused by fluctuation, etc. of conversion efficiency of the laser crystal can be suppressed, and stable output control can be assured.

In case it is wanted to increase or decrease the output itself, a preset value for a supply current value to the light emitter under constant current control is changed. When the current value is changed in the constant current control, gradients in the diagrams of FIG. 3(A) and FIG. 3(B) are changed.

Next, it is possible to independently control the first light emitter 14 and the second light emitter 21.

When the wavelength λ1 of the laser beam outputted from the first resonator 25 is made different from the wavelength λ2 of the laser beam outputted from the second resonator 26 and when the first light emitter 14 and the second light emitter 21 are selectively driven and controlled, it is possible to perform output control of laser beams with two wavelengths.

In case laser beams with a plurality of wavelengths are needed, e.g. when the solid-state laser device is used for the purpose of medical treatment, laser beams with different wavelengths are required to suit different types of treatment and different sites of treatment. This can be coped by independent control of the first light emitter 14 and the second light emitter 21 as described above.

Figure 4:
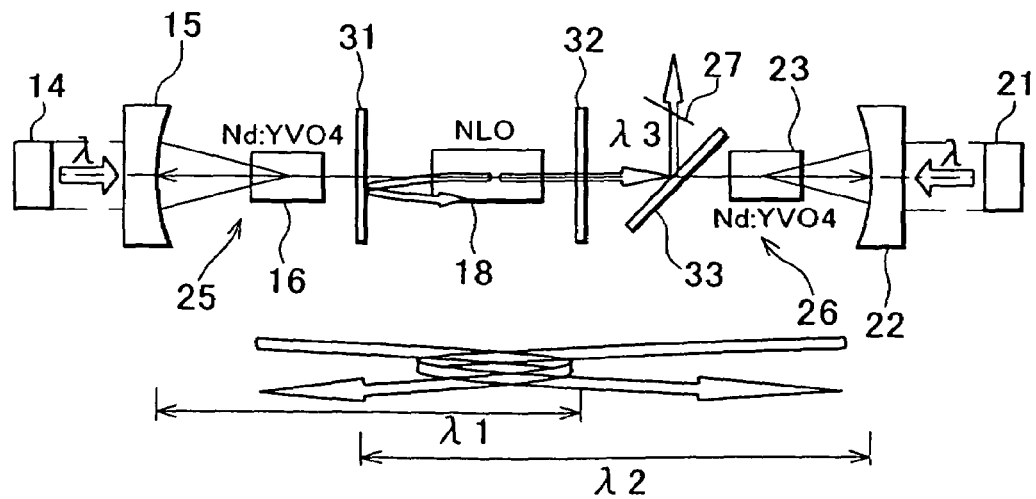
FIG. 4 is a schematical block diagram showing another embodiment of the present invention.
Figure 5:
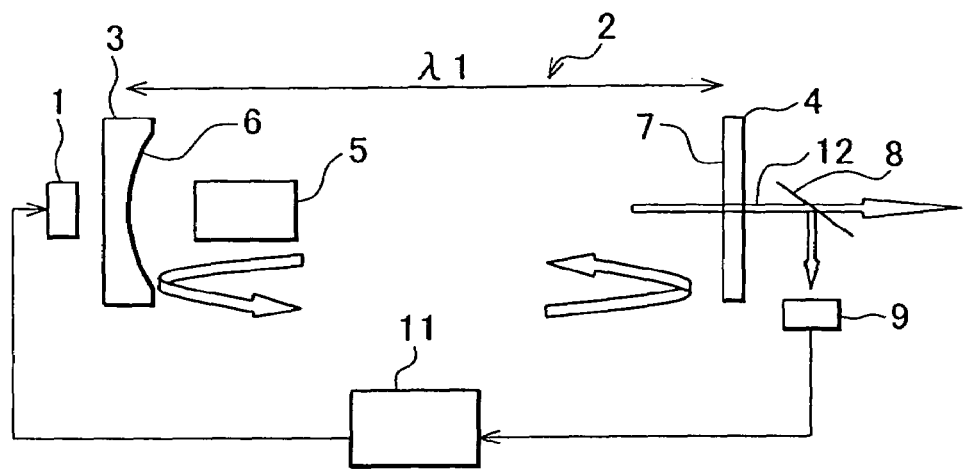
FIG. 5 is a schematical block diagram of a conventional example.
Figure 6A:
FIG. 6 represents drawings to explain control condition of the conventional example.
Figure 6B:
Figure 6C:

In the solid-state laser device as described above, the first resonator 25 and the second resonator 26 are disposed in T-shaped configuration, while the first resonator 25 and the second resonator 26 may be arranged in linear configuration as shown in FIG. 4.

In FIG. 4, the same component as shown in FIG. 1 is referred by the same symbol.

A first concave mirror 15, a first laser crystal 16, a reflection mirror 31 for the second resonator, an optical crystal 18 for wavelength conversion, a reflection mirror 32 for the first resonator, a wavelength splitting plate 33 for output, a second laser crystal 23, and a second concave mirror 22 are arranged on the same optical axis. A first resonator 25 is made up by components from the first concave mirror 15 to the reflection mirror 32 for the first resonator, and a second resonator 26 is made up by components from the second concave mirror 22 to the reflection mirror 31 for the second resonator. A portion of the optical axis between the reflection mirror 31 for the second resonator and the reflection mirror 32 for the first resonator is commonly used.

In the arrangement of the solid-state laser device as described above, the first resonator 25 and the second resonator 26 are optically separated except the optical crystal 18 for wavelength conversion.

The first concave mirror 15 is highly transmissive to a light with a wavelength of $\lambda$, and it is highly reflective to a first fundamental wave with a wavelength $\lambda 1$ as excited by the first resonator 25. The reflection mirror 31 for the second resonator is highly transmissive to a light with the wavelength $\lambda 1$, and it is highly reflective to a second fundamental wave with a wavelength $\lambda 2$ excited by the second resonator 26, and it is also highly transmissive to a wavelength conversion light with a wavelength $\lambda 3$. The reflection mirror 32 for the first resonator is highly reflective to the first fundamental wave with the wavelength $\lambda 1$, and it is highly transmissive to the second fundamental wave with the wavelength $\lambda 2$ and the wavelength conversion light with the wavelength $\lambda 3$.

The wavelength splitting plate 33 for output is highly transmissive to the second fundamental wave with the wavelength $\lambda 2$, and it is highly reflective to the wavelength conversion light with the wavelength $\lambda 3$. The second concave mirror 22 is highly transmissive to the excitation light with the wavelength $\lambda$, and it is highly reflective to the fundamental wave with the wavelength $\lambda 2$.

Further, when a laser beams with the wavelengths $\lambda 1$ and $\lambda 2$ pass through the optical crystal 18 for wavelength conversion, the wavelength $\lambda 3$ of the wavelength conversion light is generated. Pumping is performed between the reflection mirror 31 for the second resonator and the reflection mirror 32 for the first resonator. The laser beam is reflected by the wavelength splitting plate 33 for output, and it is projected as a laser beam with the wavelength $\lambda 3$. A luminous flux splitting member 27 is arranged to match the wavelength splitting plate 33 for output. A part of the laser beam with the wavelength $\lambda 3$ is split, and it is received by a photodetector for monitoring (not shown). Based on a photodetection signal, the first light emitter 14 and the second light emitter 21 are controlled by a control unit (not shown).

The solid-state laser device according to the present invention comprises two or more resonators for outputting laser beams on a same axis, a first light emitter and a second light emitter for entering excitation light to each of the resonators, a photodetector for monitoring which monitors the outputted laser beams, and a control unit for performing constant output control of at least one of the first light emitter and the second light emitter based on a signal from the photodetector for monitoring. As a result, it is possible to perform output control in the solid-state laser device provided with a plurality of resonators.

According to the present invention, the solid-state laser device is designed in such manner that an output change rate to an electric current to drive the first light emitter is made different from an output change rate to an electric current to drive the second light emitter. As a result, it is possible to carry out an output control at quick response speed and to suppressed response speed according to the situation, and this contributes to general-purpose operation in the output control.

What is claimed is:

1. A solid-state laser device, comprising two or more resonators for outputting laser beams on a same optical axis, a first light emitter and a second light emitter for entering excitation light to each of said resonators, a photodetector for monitoring which monitors the outputted laser beams, and a control unit for performing constant output control of at least one of said first light emitter and said second light emitter based on a signal from said photodetector for monitoring, wherein a first output change rate to an electric current to drive said first light emitter is made different from a second output change rate to an electric current to drive said second light emitter, and wherein said control unit controls output with different responsiveness by controlling said first light emitter or said second light emitter selectively under constant output.

2. A solid-state laser device according to claim 1, wherein at least one of said first light emitter and said second light emitter is placed under constant output control, and the other of said first light emitter and said second light emitter is driven with a constant current.

3. A solid-state laser device according to claim 1, wherein said two or more resonators each have beam waists, and the positions of said beam waists are approximately equal to each other.

4. A solid-state laser device according to claim 1, further comprising an optical crystal for wavelength conversion, wherein said optical crystal is arranged on the same optical axis.

5. A solid-state laser device according to claim 1, wherein said first output change rate of said first light emitter is made large, and said second output change rate of said second light emitting unit is made small, wherein said control unit controls output with good responsiveness by controlling said second light emitter under constant current and by controlling said first light emitter under constant output, and wherein said control unit controls output with low responsiveness by controlling said first light emitter under constant current and by controlling said second light emitter under constant output.

* * * * *